Nov. 10, 1953     J. F. STEINBAUGH     2,658,697
FISHING REEL
Filed May 27, 1950
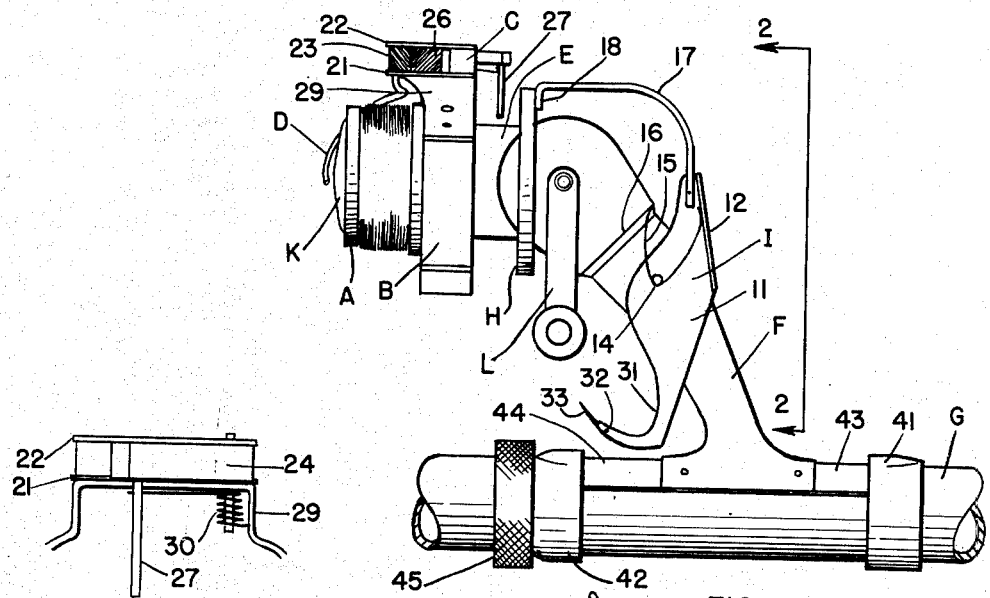
FIG. 1
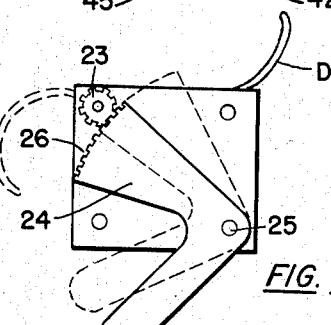
FIG. 5
FIG. 4
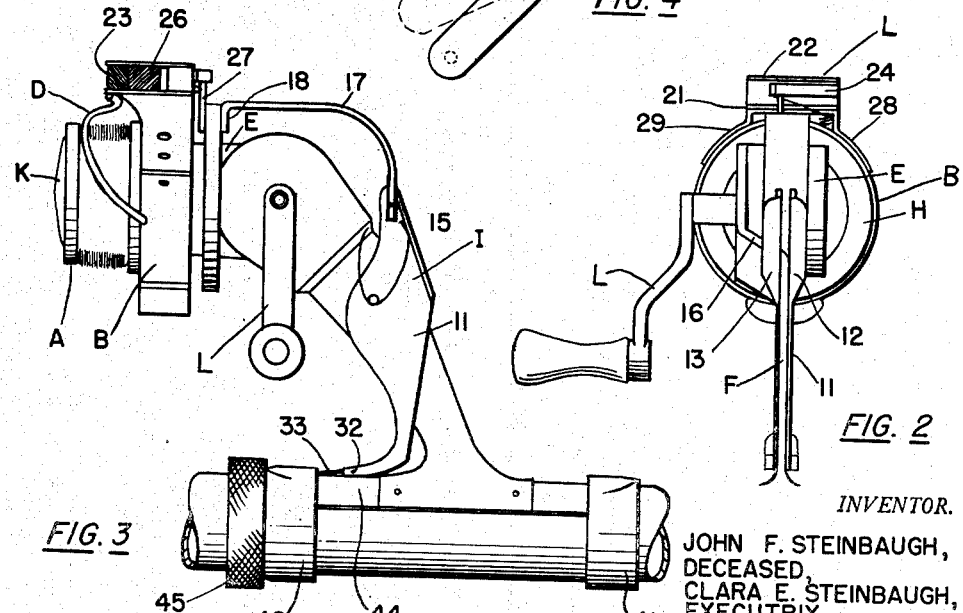
FIG. 3
FIG. 2
INVENTOR.
JOHN F. STEINBAUGH, DECEASED,
CLARA E. STEINBAUGH, EXECUTRIX
BY Jerome R. Cox
attorney Patented Nov. 10, 1953

2,658,697

UNITED STATES PATENT OFFICE 2,658,697

FISHING REEL

John F. Steinbaugh, deceased, late of Newark, Ohio, by Clara E. Steinbaugh, executrix, Newark, Ohio Application May 27, 1950, Serial No. 164,746

4 Claims. (Cl. 242—84.5)

The invention disclosed in this application relates to casting reels such as are used in fishing or angling and relates more especially to the type of reels which have come to be known as "spinning reels". In such types of reels, the reel spool remains stationary during the casting operation and the line is released from the end of the stationary spool in such a manner that resistance to the release of the line and hence to the flight of the bait or lure is reduced to a very small amount. In such types of spinning reels, there is usually provided a revolving pick-up member which is movable from an operative to an inoperative position and which when in operative position may be operated by a crank handle to cooperate with the stationary reel for winding the line thereon. Normally, the casting operation is accomplished by the right hand which holds the rod while the left hand is engaged either with another part of the rod or with the crank handle in a position to turn the crank handle to wind the line upon the reel spool. Thus in such casting operations, it is usually necessary either to shift the hands upon the rod or to move the hand from the crank handle to operate the pickup to move it from an operative to an inoperative position. It was conceived that it would be desirable to be able to move the pick-up easily from its operative to its inoperative position and vice versa by one finger of the hand which holds the rod leaving the other hand free at all times to operate the crank for the winding mechanism.

One of the objects of the invention therefore is an improvement in casting reels.

A further object of the invention is the provision of improved means for moving a pick-up mechanism for a fishing reel from an operative to an inoperative position and vice versa.

A further object of the invention is the provision of improved means for a fishing reel for simultaneously operating a brake mechanism and a pick-up member operating mechanism.

A further object of the invention is the provision of an improved means for holding the parts of a casting reel in a locked position to prevent disturbance thereof when the rod and reel are being carried to and from the place at which it is desired to use them.

A feature of the invention is the provision of a trigger mechanism associated with the part of a fishing reel which is adjacent to the rod which trigger mechanism may be operated by the trigger finger of the hand (e. g. right hand) which is holding the rod, to move a pick-up mechanism associated therewith from an operative to an inoperative position or vice versa.

Further features and objects of the invention should be apparent from a consideration of the following specification and claims when taken in connection with the accompanying drawings illustrating an embodiment of the invention.

In the drawings:

Fig. 1 is a view in side elevation of the improved fishing reel shown associated with a portion of a fishing rod, portions of the rod, however, having been broken away in order that the scale of the drawing may be adequate;

Fig. 2 is a fragmentary view in rear elevation of the reel shown in Fig. 1, such view being taken substantially on the line 2—2 of Fig. 1 and looking in the direction of the arrows;

Fig. 3 is a view similar to Fig. 1 but showing the pick-up mechanism and its operating mechanism including the trigger moved to a position in which the pick-up mechanism is inoperative and which will allow the casting of the line from the spool without interference in the type of casting known as spinning and showing the trigger mechanism and the pick-up mechanism locked in this position as for carrying the reel;

Fig. 4 is a fragmentary plan view of a detail of the pick-up operating mechanism, on an enlarged scale, the upper plate thereof having been removed in order to disclose the rack and gear mechanism thereof more clearly; and Fig. 5 is a fragmentary view in side elevation of the detail shown in Fig. 4, also on an enlarged scale.

As shown in Fig. 1, the embodiment of the improved reel consists in the illustrated embodiment thereof essentially of a normally non-rotating reel A, a rotatable winding casing B, a gear mechanism C mounted on the casing B, a pick-up lever D carried by the gear mechanism C, a driving unit E, a support F by which the driving unit E and the reel as a whole are attached to the fishing rod G, a collar H for operating the gear mechanism C, and a trigger mechanism I for translating the collar H. An adjustable screw mechanism K is provided for adjusting a brake to increase or decrease the amount of drag on the spinning of the reel A after a fish has been hooked and a crank handle L is provided for rotating the casing B.

The structure of the driving unit E, the normally non-rotating reel A which is, however, capable of spinning when the fish is hooked, the winding casing B, the support F, the screw K and its associated brake mechanism and the crank arm L may be of any convenient design in which rotation of the crank L causes rotation of the winding casing B and, if desired, a reciprocatory in and out movement of the normally non-rotating reel A and in which the reel A may spin on its support but in which its spinning movement may be restrained by an adjustable brake such as is shown for example in Pezon Patent 2,229,470, Gaire Patent 2,314,616, Lowe 2,344,209, Young 2,495,621 and Duncan 2,498,987 or in any other similar fishing reel mechanism.

However, in the invention disclosed herein there is provided the trigger mechanism I operating through the collar H and the gear mechanism C to move the pickup finger D from an operative to an inoperative position. The trigger mechanism as shown consists of a bifurcated lever 11, which has wings 12 and 13, which is pivoted on a pivot pin 14 extending through the support arm F and which is normally urged to the position shown in Fig. 1 by a spring 15 wound at an intermediate point around the pivot pin 14, and bearing at one end on wing 12 and at the opposite end on a shoulder 16 formed as a part of the support F. Secured to the upper end of the lever 11 is a strap 17 which at its forward end as at 18 is welded or otherwise securely fastened to the collar H. The collar H surrounds the driving unit E and is adapted to move transversely thereof.

The gear mechanism C comprises a pair of spaced plates 21 and 22 between which there is mounted a rotatable gear wheel 23 (see Fig. 4) and a bell crank lever 24. The lever 24 is pivoted at 25 and has an arcual rack 26 which meshes with the teeth of the gear wheel 23. The gear wheel 23 is fixed on a shaft which is pivotally mounted between the plates 21 and 22 and which is in effect a continuation of the pick-up finger D. The bell crank 24 is provided with a projection 27 with which the collar H is adapted to contact for the operation of the gear mechanism and of the pick-up finger D. As may best be seen in Fig. 2 the gear mechanism C is attached to the rotatable winding casing B by straps 28 and 29.

The lever 11 of the trigger mechanism I has a finger grip portion 31 which may be squeezed by the fore-finger as the hand as a whole holds the fishing rod G thus moving the strap 17 and the collar H with the result that the projection 27 is contacted pivoting the bell crank lever 24 and through the rack 26 and the gear 23 rotating the pick-up finger D from the full line position shown in Fig. 4 to the dotted line position thereof. In the full line position, the pick-up finger is operative (when the crank C is rotated) to wind the line upon the stationary reel. In the dotted line position thereof, the pick-up finger is inoperative and the line may be released freely from the forward end of the non-rotating reel. Subsequently the fisherman will release the finger grip 31 of the trigger mechanism and through the action of the spring 15, the trigger I and the collar H are retracted. Thereupon the bell crank 24 and the pick-up finger D are retracted by a spring 30.

At the lower end of the lever 11 (Figs. 1 and 3) at a point 32, there is pivoted a projection 33 which is provided for the purpose of locking the trigger mechanism I as for example when carrying the reel.

The rod G is provided with a pair of collars 41 and 42 each formed with a recess. Projections 43 and 44 formed on the support F are arranged to extend into these recesses. The rod G is also provided with a screw nut 45 by which the collar 42 may be adjusted to secure the support F to the rod in the well known manner. When it is desired to carry the reel and to lock the parts to prevent shaking, the nut 45 is loosened so that the sleeve 42 may slide forward on the reel. Then the projection 33 together with the projection 44 are inserted in the recess in the collar 42 and the screw nut 45 screwed on to fasten the collar 42 over the projections 33 and 44 and thus hold the mechanism in the locked position as shown in Fig. 3.

It is believed that the operation of the improvement in fishing reels which has been shown herein will be understood from the above description. The rod and reel may be carried in the condition shown in Fig. 3 or in the condition shown in Fig. 1. If, however, it is transported as shown in Fig. 3, when it is desired to begin fishing operations the nut 45 is screwed forward to allow the release of the projection 33 and then is screwed back to fasten the extension 44 of support F securely to the rod. The rod is grasped in the right hand (if being used by a right handed fisherman) and the trigger 31 is pulled back so that the pick-up finger D is moved to the position shown in Fig. 3 for the casting operation. Upon casting, the line unwinds from the spool A substantially without friction over the end of the spool. Then the trigger is released, the crank handle L is turned so that the casing B is rotated and the line is wound in. Either as the bait strikes or during the winding process, the fish may take the lure and the fisherman may continue to wind. If the fish goes away with a pull that is greater than the resistance of the brake, the line is unwound from the reel, the brake being adjusted to resist the pull as may be desired and to some extent dependent upon the strength of the line. During all this time the right hand of the fisherman need not have moved from its grasp around the rod G with the fore-finger around the support F and adjacent to the trigger 11 and the left hand operating the crank L or the brake control K or used for any other purpose.

As shown, the trigger 31 controls the pick-up finger D and the collar H which serves as a brake on the rotation of the winding casing B.

It is to be understood that the above described embodiment of the invetnion is for the purpose of illustration only and various changes may be made therein without departing from the spirit and scope of the following claims.

What is claimed is:

1. An improvement in fishing reels of the type in which there is provided a spool in which a fishing line is wound, the spool being normally non-rotating during the winding operation, in which there is provided a rotative casing having a pick-up finger for winding the line upon the spool, in which there is provided a crank for rotating the rotatable casing, and in which there is provided a support having extensions for securing the reel to a fishing rod, the improvement which comprises a trigger pivoted on such support and having a portion adjacent to the fishing rod so that it can be operated by the forefinger of the hand of the fisherman grasping the rod and means comprising an extension of said trigger, a collar movable substantially longitudinally of the rotative axis of said spool and connected to said extension for movement therewith, a bell crank lever provided with a rack mounted on said rotative casing and having an extension which may be contacted by said collar regardless of the rotative position of said casing and rack, and a gear connected to said pick-up finger and meshing with said rack, for transmitting motion from said trigger to said pick-up finger to move it from an operative position in which it is effective to wind the line upon said spool to an inoperative position in which the finger is removed from the interference with the casting of the line and the unwinding thereof from the spool.

2. An improvement in fishing reels of the type in which there is provided a spool in which a fishing line is wound, the spool being normally non-rotating during the winding operation, in which there is provided a rotative casing having a pick-up finger for winding the line upon the spool, in which there is provided a crank for rotating the rotatable casing, and in which there is provided a support having extensions for securing the reel to a fishing rod, the improvement which comprises a trigger pivoted on such support and having a portion adjacent to the fishing rod so that it can be operated by the forefinger of the hand of the fisherman grasping the rod, means comprising an extension of said trigger, a collar movable substantially longitudinally of the rotative axis of said spool and connected to said extension for movement therewith, a bell crank lever provided with a rack mounted on said rotative casing and having an extension which may be contacted by said collar regardless of the rotative position of said casing and rack, and a gear connected to said pick-up finger and meshing with said rack, for transmitting motion from said trigger to said pick-up finger to move it from the operative position in which it is effective to wind the line upon said spool to an inoperative position in which the finger is removed from interference with the casting of the line and the unwinding thereof from the spool, a spring operative upon said bell crank lever to move it to a position in which the pick-up finger mechanism is operative except when said bell crank has been rotated and said spring has been compressed by the operation of said collar, and a spring operative on said trigger for retracting said trigger.

3. An improvement in fishing reels of the type in which there is provided a spool in which a fishing line is wound, the spool being normally non-rotating during the winding operation, in which there is provided a rotative casing having a pick-up finger for winding the line upon the spool, in which there is provided a crank for rotating the rotatable casing, and in which there is provided a support having extensions for securing the reel to a fishing rod, the improvement which comprises a trigger pivoted on such support and having a portion adjacent to the fishing rod so that it can be operated by the forefinger of the hand of the fisherman grasping the rod, means to move it from an operative position in which it is effective to wind the line upon said spool to an inoperative position in which the finger is removed from interference with the casting of the line and the unwinding thereof from the spool, an extension for said trigger and a collar for the rod which cooperates with said extension to hold the parts against movement when said rod is being transported.

4. An improvement in fishing reels of the type in which there is provided a spool on which a fishing line is wound, the spool being normally non-rotating during the winding operation, in which there is provided a rotative casing having a pick-up finger for winding the line upon the spool, in which there is provided a crank for rotating the rotatable casing, and in which there is provided a support having extensions for securing the reel to a fishing rod, said rod being provided with a pair of collars under which said extensions are normally anchored, the improvement which comprises a trigger pivoted on such support having a metal strap at one end serving as an extension and secured to a non-rotating collar and having a portion adjacent to the fishing rod so that it can be operated by the forefinger of the hand of the fisherman grasping the rod and having an extension which is at times engaged by one of said collars to hold the parts against movement while the reel is not being used and means comprising a gear case carried by said rotative casing which rotates therewith and which carries a gear wheel secured to said pick-up finger, and a pivoted bell crank lever formed with a rack which meshes with said gear and with an extension which is contacted at times by said non-rotatable collar for transmitting motion from said trigger to said pick-up finger to move it from an operative position in which it is effective to wind the line upon said spool to an inoperative position in which the finger is removed from interference with the casting of the line and the unwinding thereof from the spool and a spring connected with said bell crank for normally moving the pick-up finger to its operative position.

CLARA E. STEINBAUGH,
*Executrix of the last will and testament of the late John F. Steinbaugh, deceased.*

References Cited in the file of this patent

UNITED STATES PATENTS

| Number | Name | Date |
|---|---|---|
| 2,303,645 | Lacy | Dec. 1, 1942 |

FOREIGN PATENTS

| Number | Country | Date |
|---|---|---|
| 237,582 | Switzerland | Aug. 16, 1945 |
| 256,183 | Switzerland | Feb. 16, 1949 |